United States Patent [19]

Day

[11] Patent Number: 5,031,960
[45] Date of Patent: Jul. 16, 1991

[54] CHILD RESTRAIN FOR VEHICLES

[76] Inventor: Herman F. Day, 478 Lazy Wood La., Fort Mill, S.C. 29715

[21] Appl. No.: 428,625

[22] Filed: Oct. 30, 1989

[51] Int. Cl.5 .............................................. A47C 31/00
[52] U.S. Cl. .................................. 297/254; 297/465; 297/485; 297/250
[58] Field of Search ............... 297/254, 465, 485, 484, 297/250

[56] References Cited

U.S. PATENT DOCUMENTS

| 2,877,833 | 3/1959 | Boles | 297/485 |
| 3,165,357 | 1/1965 | Ruedemann, Jr. | 297/484 |
| 3,218,103 | 11/1965 | Boyce | 297/465 X |
| 3,321,247 | 5/1967 | Dillender | 297/465 |
| 3,632,165 | 1/1972 | Miller | 297/254 |
| 3,992,040 | 11/1976 | Gannac | 297/465 |
| 4,143,914 | 3/1979 | Klich | 297/465 |
| 4,759,569 | 7/1988 | Potter | 297/465 X |

Primary Examiner—Peter A. Aschenbrenner
Attorney, Agent, or Firm—Rhodes, Coats & Bennett

[57] ABSTRACT

This invention relates to the protection of children riding in motor vehicles against injury otherwise possibly occurring. More particularly, this invention relates to a child restraint which both exercises the necessary restraint against uncontrolled movement of the child within the vehicle and permits freedom of movement among standing, sitting and lying postures for the child. The device functions by providing a vest for engaging the torso of a young person, a backrest for engaging the upright seat back of a seat in a vehicle, and coupling the vest and backboard through a pair of rodlike members defining generally vertical, parallel and spaced apart restraints.

9 Claims, 2 Drawing Sheets

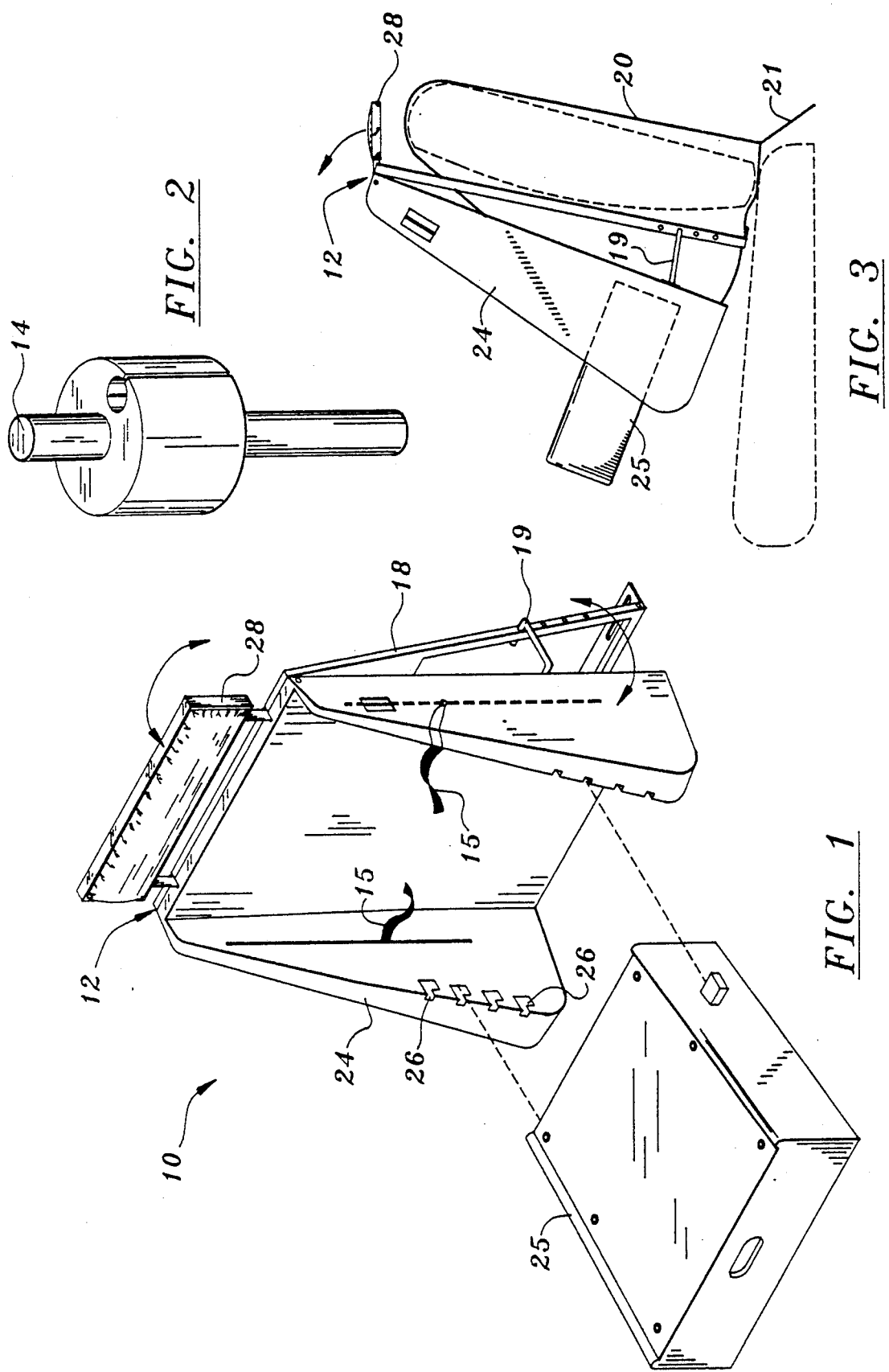

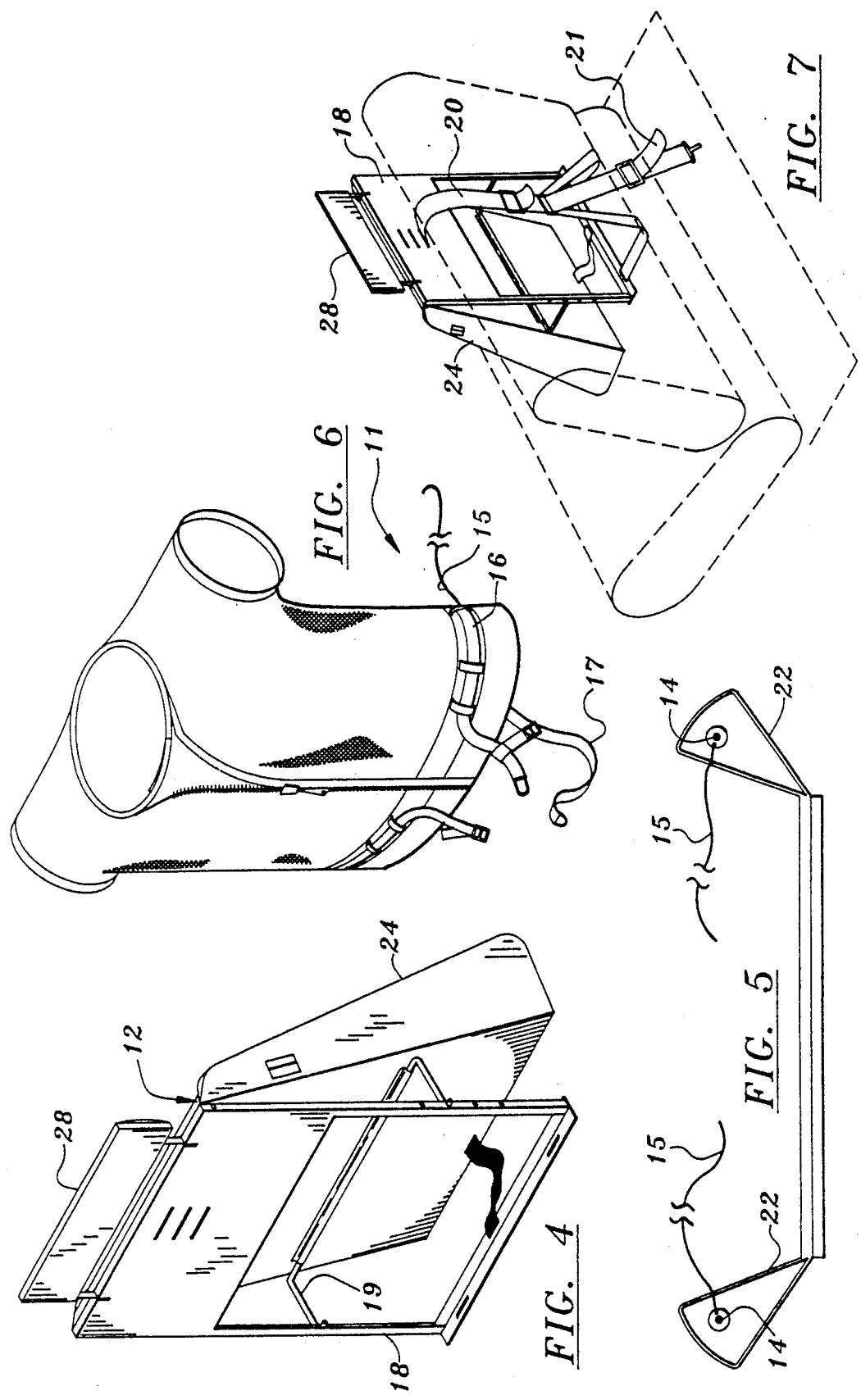

CHILD RESTRAIN FOR VEHICLES

FIELD AND BACKGROUND OF INVENTION

This invention relates to the protection of children riding in motor vehicles against injury otherwise possibly occurring. More particularly, this invention relates to a child restraint which both exercises the necessary restraint against uncontrolled movement of the child within the vehicle and permits freedom of movement among standing, sitting and lying postures for the child.

Restraints for passengers in motor vehicles, and particularly for children, have been proposed for a long time and are the subject matter of a number of prior disclosures. More recently, such restraints have become the subject matter of legislative control, and a number of jurisdictions now have regulations requiring use of such restraints and requiring that the restraints meet certain defined standards. To the best knowledge of the present inventor, such restraints uniformly impose on a child so restrained limitations which prevent free movement of the child among sitting, standing and lying postures. Those limitations have been necessary, in the view of prior designers and inventors, to achieve the desired safety for the restrained passenger.

SUMMARY OF THE INVENTION

With the foregoing in mind, it is an object of this invention to provide a passenger restraint, and particularly a child restraint, which both exercises the necessary restraint against uncontrolled movement of the child within a vehicle and permits freedom of movement among standing, sitting and lying postures for the child. In realizing this object of the present invention, apparatus is provided which will positively position a restrained passenger while permitting free movement over a defined range of locations. The range of locations is defined by the cooperation of means engaging the torso of the passenger and a pair of rodlike members spaced apart horizontally and extending generally vertically adjacent the generally upright seat back of a vehicle seat.

Yet a further object of this invention is to provide a child occupying a seat in a motor vehicle with choices among sitting, standing and lying postures while providing assurance for the adult charged with care of the child that the child is restrained in compliance with the requirements of applicable laws. In realizing this object of the invention, both child-passengers and adult caretakers are relieved and motor vehicle travel is made more pleasurable for both.

BRIEF DESCRIPTION OF DRAWINGS

Some of the objects of the invention having been stated, other objects will appear as the description proceeds, when then in connection with the accompanying drawings, in which:

FIG. 1 is a perspective view of the apparatus of this invention;

FIG. 2 is an enlarged perspective view of certain important components of the apparatus of FIG. 1;

FIG. 3 is a side elevation view showing the apparatus of FIG. 1 as positioned for use on a vehicle seat;

FIG. 4 is a rear perspective view of the apparatus of FIGS. 1 and 3;

FIG. 5 is a section view through an upper portion of the apparatus of FIG. 4;

FIG. 6 is a perspective view of a vest forming a portion of the apparatus of this invention; and FIG. 7 a view similar to FIG. 4 showing the apparatus of this invention as positioned for use on a vehicle seat.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, the apparatus of the present invention is there illustrated and generally identified at 10 (FIGS. 1, 3, 4 and 7). In accordance with this invention, the apparatus comprises means, preferably in the form of a vest 11 (FIG. 6), for engaging the torso of a young person. The apparatus also has means generally indicated at 12 for engaging the upright seat back of a seat in an automotive vehicle, and means (described more fully hereinafter) for coupling the torso engaging means 11 and the seat back engaging means 12 together and thereby for restraining a young person wearing the vest means 11 against excessive movement while permitting movement among lying, sitting and standing positions.

In accordance with important distinguishing characteristics of this invention, the last named means comprises a pair of rodlike members 14 (FIGS. 2 and 5) defining generally vertical, parallel and spaced apart restraining means, and means (shown in the form of straps 15) for coupling the vest 11 to the rodlike members 14 and for accommodating movement of a young person among various positions while restricting movement of the torso of the young person out of the plane defined between the rodlike members. The rodlike members are housed within the seat back engaging means 12 as will be described hereinafter.

Turning for the moment to the vest or torso engaging means 11, that portion of the apparatus of this invention preferably is made for extending over the shoulders of, and substantially enclosing, the torso of a young person. The vest 11 preferably includes reinforcing straps 16 for encircling the waist of a young person wearing the vest and a crotch strap 17 for passing between the legs of the young person.

The straps 15 or other means for coupling the vest and the seat back engaging portion 12 cooperate with the vest 11 for limiting the position of the torso of a wearer of the vest to a location spaced vertically between the pair of rodlike members 14 while permitting free vertical movement among sitting, standing and lying postures. This freedom is in part accommodated by the seat back engaging portion 12 which is itself composed of a number of elements, specifically including a back board 18, a positioning means 19 mounted to the back board 18 for adjusting the angle between the back board and a generally upright seat back of a vehicle, and strap means 20 for securing the positioning means 19 against a forward surface of the generally upright seat back of a vehicle (FIGS. 1, 3 and 4). The straps 20 may include an anchor strap 21 for securing the positioning means 19 to the floor structure of a vehicle.

The apparatus 10 has enclosure portions 22 for enclosing the rodlike members 14 (which preferably are, as shown, mounted in a forward backrest portion 24), and those enclosure portions 22 define elongate generally vertical slots (FIG. 1) for permitting vertical movement of the coupling means or straps 15. Openings formed in the outer surfaces of the enclosure portions 22 accommodate adjustment of the straps 15 for properly positioning a young person wearing the vest 11 between the rodlike members 14. An accessory seat 25 or sitting surface may be mounted in locking slots 26 provided in the backrest 24, to provide a support for a child who wishes to sit while in the restraint of this invention. A headrest portion 28 is pivotally connected with the forward backrest portion 24 for movement between a lowered position and a raised position (FIG. 3). In the raised position, the headrest 28 serves to protect a young person against whiplash injury such as could otherwise occur should a vehicle in which the person is riding be struck from the rear while the person is standing.

In use, a child to be a passenger in a motor vehicle such as an automobile or aircraft equipped with the apparatus of this invention is clothed with the vest 11, and then the connecting straps 15 are attached to the rodlike members 14 by a means which permits free movement of the point of connection along the rods. Such attachment may be by an arrangement as simple as a loop encircling the rods or by some more sophisticated means such as low friction sleeve, ball or roller bearings (FIG. 2). The point of such engagement is to hold the restrained child in a location which is within a range of locations or positions defined by the rodlike members 14 and the connection of the vest to those members while allowing the child freedom to stand, sit or lie so long as the torso (and vest) are located approximately medially of the space between, and along a line parallel to, the rodlike members.

In the drawings and specifications there has been set forth a preferred embodiment of the invention and, although specific terms are used, the description thus given uses terminology in a generic and descriptive sense only and not for purposes of limitation.

What is claimed is:

1. Apparatus for protecting a young person occupying a vehicle against injury otherwise possibly occurring and comprising:
    means for engaging the torso of a young person,
    means for engaging the upright seat back of a seat in a vehicle, wherein said second named means comprises backrest means, positioning means mounted to said backrest means for adjusting the angle between said backrest means and a generally upright seat back of a vehicle, and strap means for securing said positioning means against a forward surface of the generally upright seat back of a vehicle, and
    means for attaching said first and second named means and for restraining a young person engaged by said first named means against excessive movement while permitting movement between sitting and standing positions, said last named means comprising
    a pair of rodlike members mounted in said backrest means defining generally vertical, parallel and spaced apart restraining means, and
    means for attaching said first named means to said rodlike members and for accommodating movement of a young person among various positions while restricting movement of the torso of the young person out of the plane defined between said rotlike members.

2. Apparatus according to claim 1 wherein said first named means comprises vest means for encircling the torso of a young person.

3. Apparatus according to claim 2 wherein said vest means is configured for extending over the shoulders of the torso of a young person.

4. Apparatus according to claim 2 wherein said vest means includes reinforcing straps for encircling the waist of a young person.

5. Apparatus according to claim 2 wherein said coupling means cooperates with said vest means for limiting the position of the torso of a wearer of the vest to a location spaced vertically between said pair of rodlike members.

6. Apparatus according to claim 1 wherein said strap means further comprises anchor strap means for securing said positioning means to the floor structure of a vehicle.

7. Apparatus according to claim 1 wherein said backrest means comprises enclosure portions for enclosing said rodlike members, and further wherein said enclosure portions define elongate generally vertical slot means for permitting vertical movement of said coupling means.

8. Apparatus according to claim 7 wherein said rodlike members are mounted in said backrest means.

9. Apparatus for protecting a young person occupying a vehicle against injury otherwise possibly occurring and comprising:
    vest means for encircling and engaging the torso of a young person, said vest means being configured for extending over the shoulders of the torso of a young person,
    positioning means for engaging the upright seat back of a seat in a vehicle,
    backrest means operatively connected with said positioning means for connection with the upright seat back and for adjustment of the angle between said backrest means and a generally upright seat back of a vehicle,
    strap means operatively connected with said positioning means for securing said positioning means against a forward surface of the generally upright seat back of a vehicle, and
    means for attaching said vest means and said backrest means and for restraining a young person engaged by said vest means against excessive movement while permitting movement between sitting and standing positions, said last named means comprising
    a pair of rodlike members mounted in said backrest means defining generally vertical, parallel and spaced apart restraining means, and
    means for attaching said vest means to said rodlike members and for accommodating movement of a young person among various positions while restricting movement of the torso of the young person out of the plane defined between said rodlike members.

* * * * *